(No Model.) 2 Sheets—Sheet 1.

A. BONNORONT.
APPARATUS FOR RAISING AND DRAWING OFF LIQUIDS.

No. 554,576. Patented Feb. 11, 1896.

Witnesses:
Georges Laurent
Eugène Wallier

Inventor:
Alphonse Bonnoront

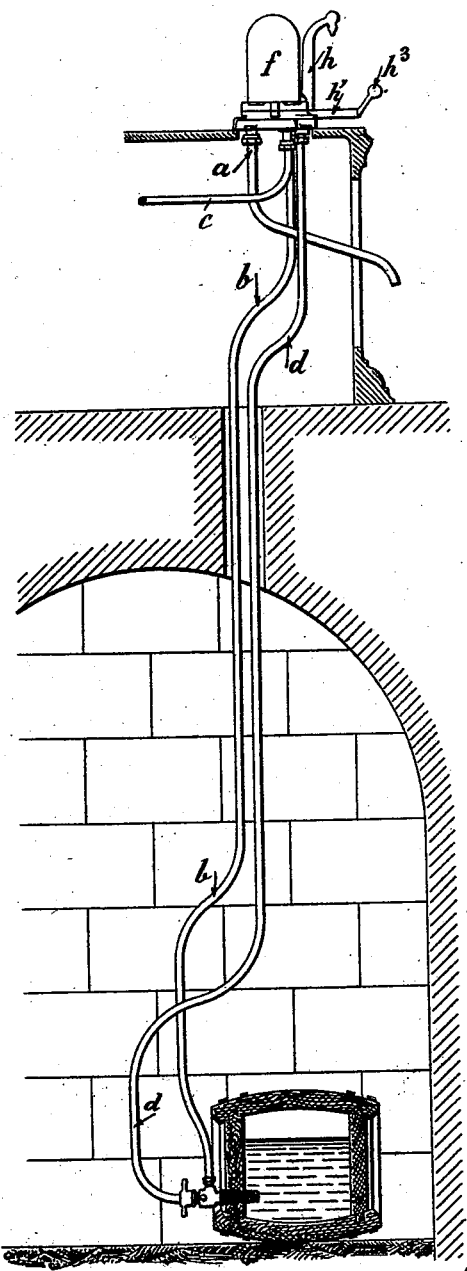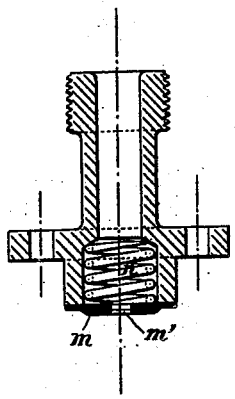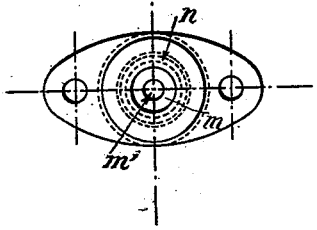

UNITED STATES PATENT OFFICE.

ALPHONSE BONNORONT, OF PARIS, FRANCE.

APPARATUS FOR RAISING AND DRAWING OFF LIQUIDS.

SPECIFICATION forming part of Letters Patent No. 554,576, dated February 11, 1896.

Application filed August 22, 1894. Serial No. 520,966. (No model.) Patented in France June 8, 1894, No. 239,140.

*To all whom it may concern:*

Be it known that I, ALPHONSE BONNORONT, mechanical engineer, of 2 Boulevard de Strasbourg, Paris, in the Republic of France, have invented new Improvements in Apparatus for Raising and Drawing Off Liquids, (for which I have obtained Letters Patent of France for fifteen years, dated June 8, 1894, No. 239,140;) and I do hereby declare that the following is a full and exact description thereof, reference being made to the accompanying drawings.

My invention has for its object to provide apparatus intended for raising liquids, which operation is effected by using the water-pressure from a tank or any other suitable source.

My improved liquid-raising apparatus comprises neither a flap-valve nor piston. Its working is sure and its operation easy. It consists, in principle, of a vessel adapted to communicate with the atmosphere on the one hand and with the supply of liquid to be raised on the other hand. When this vessel is operated so as to put it in communication with the supply of liquid to be raised, its communication with the atmosphere is cut off, and at the same time water under pressure is introduced into the vessel. This water compresses the air contained in the vessel and also in a closed cask or other receptacle in communication with the said vessel and containing the liquid to be raised, which liquid rises under this pressure and escapes through a faucet or discharge-tube, where it is easily received either in a glass or any other suitable receiver. This liquid-raising apparatus may be used in the place of the beer-pumps now employed, but it may also be used for the raising of other liquids of whatever kind.

Figure 1:
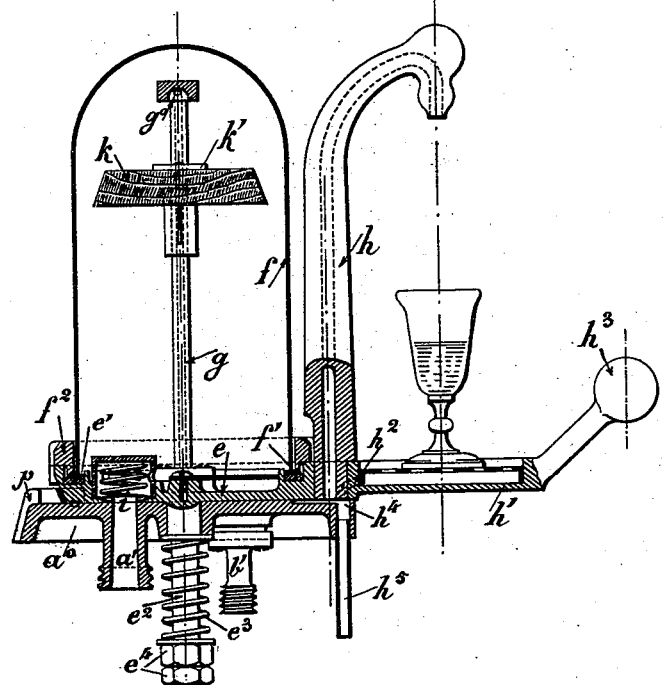
Figure 3:
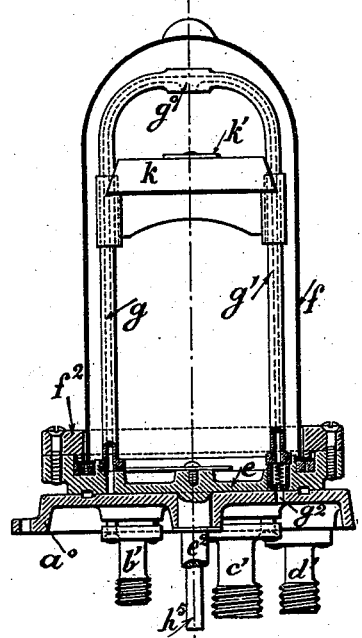
Figure 2:
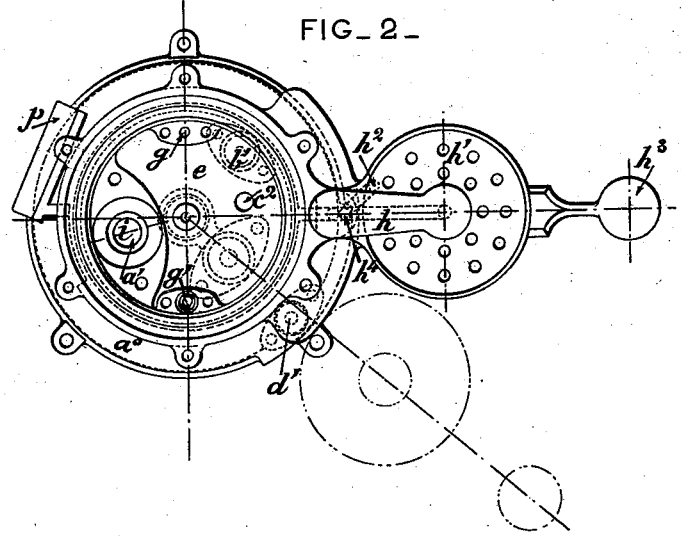
Figure 4:
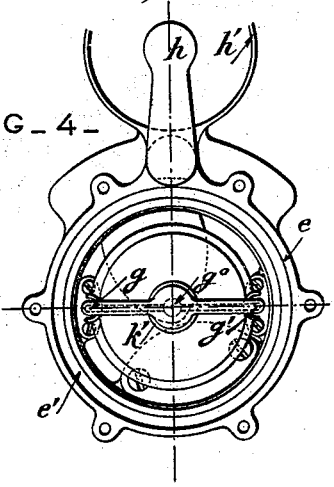

In the accompanying drawings, Figure 1 is a sectional elevation of the liquid-raising apparatus. Fig. 2 is a plan view of the apparatus, showing how the delivery is effected. Fig. 3 is a sectional elevation of the liquid-raising apparatus taken at right angles to Fig. 1. Fig. 4 is a plan view of the apparatus as represented in Fig. 3. Fig. 5 is a view of the fittings and connections of my apparatus. Figs. 6 and 7 are a vertical section and a plan view, respectively, of a special device for obtaining a water-tight joint.

The liquid-raising apparatus consists, essentially, of two distinct parts, one fixed and the other movable around the axis of the fixed part.

The fixed part comprises a plate or tray $a^0$, which, for instance, may be fixed by means of screws onto a beer-dispensing counter, and four tubes $a'$ $b'$ $c'$ $d'$, connecting respectively with the pipes $a$ $b$ $c$ $d$, Fig. 5, and passing through the fixed plate $a^0$.

The movable part comprises a delivery-tray $e$, having a circular groove $e'$, at the bottom of which is placed a rubber ring, on which rests the downturned edge $f'$ of a recipient $f$, firmly held down by a flange or collar $f^2$, tightened down on the tray $e$ by means of a sufficient number of screws to make a water-tight joint.

On the tray $e$ is fixed a bolt $e^2$, around which is wound a spiral spring $e^3$, which is for the purpose of pressing the plates or trays $a^0$ and $e$ one against the other, in order to make a water-tight joint between their contacting-surfaces. Nuts $e^4$ $e^4$, screwed onto the bolt $e^2$, allow of compressing the spring $e^3$ to a less or greater extent.

Within the recipient $f$ is arranged a U-shaped tube, the two branches $g$ $g'$ of which connect with holes passing through the movable tray $e$ and leading into a small common recess or chamber, in the flat bottom of which is a hole $g^0$, which causes either of the two branches $g$ $g'$ to connect with the recipient $f$. On this plate or tray $e$ is also mounted a pipe $h$, having the shape of a goose-neck at its upper part, and the discharge-opening of the said pipe or tube is located above a support $h'$, integral with the movable plate $e$. This support $h'$ is hollowed out cylindrically or otherwise, and through its bottom runs an inclined channel $h^2$. The support $h'$ is, moreover, provided with a handle $h^3$, cast integral with the support. The plate or tray $e$ has two other holes, $c^2$ and $i$, passing through it, and the fixed plate or tray $a^0$ has also two other small holes, $h^4$ and $g^2$. A cork float $k$, provided at its upper part with a rubber washer $k'$, is held to slide between the branches $g$ $g'$, as is clearly shown in Fig. 3.

In order to prevent the fluids from escaping on account of leakage at the joint of the plates or trays $a^0$ and $e$ or through the edges of the several holes or orifices hereinbefore mentioned, each of the latter is provided with a special joint (represented in Fig. 6) consisting of a leather washer $m$, having a central hole $m'$ and subjected to the action of a coiled spring $n$, which obliges it to bulge outward from its support and bear or press against the friction-surface with which it makes a water-tight joint.

Operation: When at rest the fixed and movable parts of the liquid-raising apparatus, as well as the several orifices of the plates or trays $a^0$ and $e$, occupy the respective positions, as shown in the drawings. If, by means of the handle $h^3$, the plate or tray $e$ is turned to a suitable extent, which is determined by an abutment $p$, the orifice of the branch $g$ will register with the orifice $b'$ and the hole $c^2$ with the tube $c'$, and likewise the pipe $h$ will register with the tube $d'$, while the hole $i$ moves away from the tube $a'$, which thus becomes closed. The water under pressure arrives by the pipe $c$ to the tube $c'$, and penetrates by the hole $c^2$ into the recipient $f$ and compresses the air contained in the said recipient $f$. The pipe $b$ connects, for instance, with the cask containing the liquid to be raised. The air-pressure in the recipient $f$ is transmitted to this cask through the branch $g$ of the U-shaped tube, the tube $b'$ and the tube $b$, and the liquid contained in the said cask then rises through the pipe $d$, the tube $d'$ and the pipe $h$, and runs from the discharge-orifice of the said tube $h$ into a glass or any other receiver placed on the support $h'$. When the glass or receiver is full, the handle $h^3$ is turned so as to bring the plate or tray $e$ back to its normal or first position. The water contained in the recipient $f$ escapes through the hole $i$ and the tube $a'$, while the said recipient is in communication with the atmosphere through the branch $g'$ and the orifice $g^2$ on the one hand, and through the tube $a'$ on the other hand, so that the air contained in the recipient $f$ can be renewed after each operation. As the orifices $d'$ and $h$ no longer register the flow of liquid through the pipe $h$ stops instantaneously. If, through inattention or for any other reason, the receiver placed on the support $h'$, or rather on a perforated plate with which the said support is provided, is allowed to run over, the liquid thus running over runs off through the channel $h^2$ and the orifice $h^4$, whence a small tube $h^5$ conducts this liquid into any suitable receiver placed for that purpose. All loss of liquid is thus prevented and it will be understood that each operation can be very quickly made. If, through too great a pressure, the water, which is the motive power, rises too high in the recipient $f$, the float $k$ rises also in the said recipient, guided between the branches $g\ g'$ of the U-shaped tube, and the washer $k'$ obstructs the hole $g^0$, so the water can in no case mix with the liquid to be raised.

I claim—

1. A liquid-dispensing apparatus, comprising two plates provided with openings adapted to register with one another, one of the plates being movable and the other relatively stationary, a support connected to the movable plate and adapted to receive a glass or other vessel, and a discharge-tube likewise secured to the movable plate and arranged with its orifice above the said support, substantially as described.

2. A liquid-dispensing apparatus, comprising a recipient and channels or tubes leading into the upper part of the said recipient, an outwardly-projecting tube adapted for connection with the said channels and with a keg or other receptacle, the recipient being provided at its bottom with ports for the admission of a liquid under pressure to compress the air in the upper part of the recipient and force the compressed air into the keg to raise the liquid therefrom, a discharge-tube located adjacent to the recipient and adapted for connection with the keg, and a support for a glass or other vessel to receive the liquid discharged from the said tube, substantially as described.

3. A liquid-dispensing apparatus, comprising two plates provided with openings adapted to register with one another, one of the plates being fixed and the other movable, a recipient into which fluid may enter when sundry of the said openings register, and a discharge-tube connected to one of the registering openings and so arranged that the openings corresponding to said discharge-tube will register when the inlet-openings to the recipient do register, substantially as described.

4. A liquid-dispensing apparatus, comprising two plates provided with openings adapted to register with one another, one of the plates being fixed and the other movable, a recipient into which fluid may enter when sundry of the said openings register, a discharge-tube connected to one of the registering openings and so arranged that the openings corresponding to said discharge-tube will register when the inlet-openings to the recipient do register, and a support adapted to receive a glass or other vessel to receive the liquid delivered at the discharge-tube, substantially as described.

5. A liquid-dispensing apparatus, comprising a fixed plate having a series of openings, and another plate pivoted to the fixed plate and provided with a series of openings adapted to register with those of the fixed plate, a recipient secured to the movable plate so as to cover sundry of the openings therein, a tube leading from the upper part of the recipient to one of the openings in the movable plate, and a discharge-tube connected to an opening of the movable plate which is without the recipient, substantially as described.

6. In a liquid-dispensing apparatus, the combination with a stationary part having a port for the passage of the liquid, of a movable part adapted to close said port and provided with a port adapted to register with the port in the stationary part, a discharge-tube secured to the movable part and connected to the port therein, and a support for a glass or other vessel, said support being secured to the movable part so as to remain in the same relative position to the discharge-tube during the movement of said plate, substantially as described.

7. The combination of the recipient provided with ports for the admission of a liquid under pressure, and channels or tubes leading into the upper end of the recipient and being provided therein, upon their lower side, with an opening for the escape of air from said recipient, and a float located in the recipient and provided on its upper face with a washer adapted to close the opening in the air-escape tube, substantially as described.

8. The combination of the air-recipient, provided with ports for the admission of a liquid under pressure, tubes extending into the upper part of the recipient and provided with an opening therein for the escape of air, and a float having guided movement on the said tubes and adapted to close the said opening, as and for the purpose set forth.

9. The combination of two plates, one fixed and one movable, and each provided with openings adapted to register with one another, viz: inlet and outlet ports for a liquid under pressure and air, and discharge-ports for the liquid to be dispensed, and an air-recipient so located that its interior may communicate with the inlet and outlet ports for the liquid under pressure and air, but will have no communication with the discharge-ports for the liquid to be dispensed, substantially as described.

10. The combination of a movable and a relatively-fixed plate having openings adapted to register with one another, an apertured flexible membrane having its outer or marginal portion secured to one of the plates at the opening thereof, and a spring having a bearing against the said plate and against the inner portion of the membrane to force the latter into close contact with the other plate, substantially as described.

In witness whereof I have hereunto set my my hand in presence of two witnesses.

ALPHONSE BONNORONT.

Witnesses:
GEORGES LAURENT, Jr.,
EUGÉNE WATTIE.